(12) United States Patent
Wheeler et al.

(10) Patent No.: US 6,535,948 B1
(45) Date of Patent: Mar. 18, 2003

(54) SERIAL INTERFACE UNIT

(75) Inventors: Paul Kurt Wheeler, Allentown, PA (US); Andrew Lawrence Webb, Hamilton, NJ (US); William G. Burroughs, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 307 days.

(21) Appl. No.: 09/583,493

(22) Filed: May 31, 2000

(51) Int. Cl.[7] .............................................. G06F 13/36
(52) U.S. Cl. ..................................................... 710/310
(58) Field of Search ................................ 710/105, 310

(56) References Cited

U.S. PATENT DOCUMENTS 5,426,784 A * 6/1995 Kawata et al. ............. 365/219
5,758,073 A * 5/1998 Liang et al. ................ 710/105
5,850,268 A * 12/1998 Ohki et al. ................. 348/555

\* cited by examiner

Primary Examiner—Peter Wong
Assistant Examiner—David Glass
(74) Attorney, Agent, or Firm—Ryan, Mason & Lewis, LLP

(57) ABSTRACT

A serial interface unit having an input shift register adapted to receive a serial input data from a serial data stream, and a destination request module. The input shift register converting the serial input data into a parallel input data. The input shift register in communication with at least two processors and the destination request module. The destination request module in communication with one of the at least two processors in response to an input shift register status signal and a processor designation signal, the selected processor adapted to receive the parallel input data.

42 Claims, 3 Drawing Sheets

SERIAL INTERFACE UNIT

FIELD OF THE INVENTION

The invention relates to a serial interface unit in the field of microelectronics. In particular, the invention relates to a serial interface unit that is capable of facilitating the communication of data between a data stream and multiple processors.

DESCRIPTION OF THE RELATED ART

Processors traditionally receive data through serial input/output (I/O) units or ports. Each processor typically has at least one designated I/O port, each port having a number of input pins and a number of output pins. An enhanced serial I/O unit (ESIO) designed by Lucent Technologies and included in Lucent's DSP16210 digital signal processor is exemplary of prior art serial I/O units. The ESIO is a programable, hardware-managed, double-buffered, full-duplex serial I/O port designed to support multi channel I/O processing on a time-division multiplex information highway. It has a four-pin input interface and a five-pin output interface. The ESIO communicates I/O buffer status to the processor core using input buffer full, output buffer empty, and other interrupt signals.

The ESIO contains 16 memory-mapped, double-buffered serial-to-parallel input demultiplexor registers. These 16-bit registers can be configured to demultiplex a maximum of 16 logical input channels. A logical input channel is a non-overlapping sequence of a fixed length of consecutive bits identified by a starting bit position within a frame of data.

The ESIO also contains 16 memory mapped, double-buffered parallel-to-serial output multiplexor registers. These 16-bit registers can be configured to multiplex a maximum of 16 logical output channels. Similar to the logical input channel, the logical output channel is a non-overlapping sequence of a fixed length of consecutive bits identified by a starting bit position within the frame.

Prior art serial I/O units, such as the ESIO, convert serial data from a data stream into parallel data for processing by a processor, and also convert parallel data from the processor into serial data which is returned to the data stream. However, in the prior art, each processor has a distinct, designated serial I/O unit. Generally, serial I/O units and their associated processors are contained within a single computer chip. Thus, integrated circuits specifically designed to accommodate a multitude of processors necessarily would also contain an associated serial I/O unit or port for each processor.

A need exists in the art of microelectronics for an integrated circuit capable of servicing multiple processors irrespective of the number of processors or processor types. The present invention addresses this need by providing a serial interface unit having a source request module for selecting one of at least two processors prior to transmitting data between the selected processor and a data stream. The invention further provides a method for transmitting and receiving data between a data stream and multiple processors using a destination request module.

SUMMARY OF THE INVENTION

The invention relates to a serial interface unit for processing data and a method therefor. In one embodiment, the serial interface has an input shift register and a destination request module. The input shift register is connected to at least two processors and is adapted to receive a serial input data from a serial data stream. Upon receipt of the serial input data, the input shift register converts it into parallel input data. Preferably, an input data buffer is connected between the input shift register and the at least two processors. The destination request module is connected to the input shift register and communicates with one of the at least two processors in response to an input shift register status signal and a processor designation signal. In the embodiment that includes the input data buffer, the destination request module communicates with one of the at least two processors in response to an input buffer status signal and the processor designation signal.

In another embodiment, the serial interface unit has a source request module and an output shift register. The output shift register is in communication with at least two processors and is adapted to receive a parallel output data from at least one of the processors. Preferably, an output data buffer is connected between the at least two processors and the output shift register. The source request module is in communication with the output shift register and communicates with one of the processors in response to an output shift register status signal and a processor designation signal. In the embodiment that includes the output data buffer, the source request module communicates with one of the at least two processors in response to an output buffer status signal and the processor designation signal. The output shift register is adapted to receive the parallel output data from at least one of the processors and convert the parallel output data into serial output data.

In either of the embodiments, the processor may be a digital signal processor, a microprocessor or a microcontroller.

In another embodiment, at least one of the serial interface units mentioned above may have a processor selection unit in communication with the request module. The processor selection unit provides the processor designation signal to the request module. The processor selection unit may further have a multiplexor, a channel counter and a processor selection register. The multiplexor supplies the processor designation signal to the request module. The channel counter is in communication with the multiplexor and provides a predetermined one of a plurality of channel counts to the multiplexor. The processor selection register is in communication with the multiplexor, the processor selection register providing the multiplexor with a processor identification information for each of the plurality of channel counts. The processor designation signal, in a preferred embodiment, comprises the processor identification information corresponding to the predetermined channel count.

The invention further contemplates a method for processing serial input data. One method of the invention comprises the steps of receiving the serial input data from a serial data stream, converting the serial input data into parallel input data, communicating the parallel input data directly to a data bus, or optionally via an input data buffer to the data bus, generating an input shift register full signal when the input shift register contains the parallel input data, or in the embodiment having an input data buffer, generating an input buffer full signal when the input data buffer contains the parallel input data, receiving the input shift register full signal at a destination request module, or in the embodiment having an input data buffer, receiving the input data buffer full signal at a destination request module, generating a processor designation signal representing a designated processor, receiving the processor designation signal at the destination request module, sending a service request to the designated processor, and receiving the parallel input data at the designated processor via the data bus.

Another method of the invention comprises the steps of viewing a status of an output shift register, generating an output shift register empty signal when the output shift register is without parallel output data, receiving the output shift register empty signal at a source request module, generating a processor designation signal representing a designated processor, receiving the processor designation signal at the source request module, sending a service request to the designated processor, applying the parallel output data to a data bus, receiving the parallel output data at the output shift register via the data bus, and converting the parallel output data into serial output data.

The invention further contemplates a method for substantially simultaneously processing serial input data from a serial data stream and parallel output data from at least two processors via a serial interface unit.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF PREFERRED EMBODIMENTS OF THE INVENTION

The present invention comprises a novel method and apparatus for communicating data between a serial data stream and a processor. The following description is presented to enable any person skilled in the art to make and use the invention. Descriptions of specific applications are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown. On the contrary, the description of the invention set forth herein is intended to cover all alternatives, modifications and equivalents as may be included within the spirit and scope of the invention as defined by the appended claims.

Figure 1:
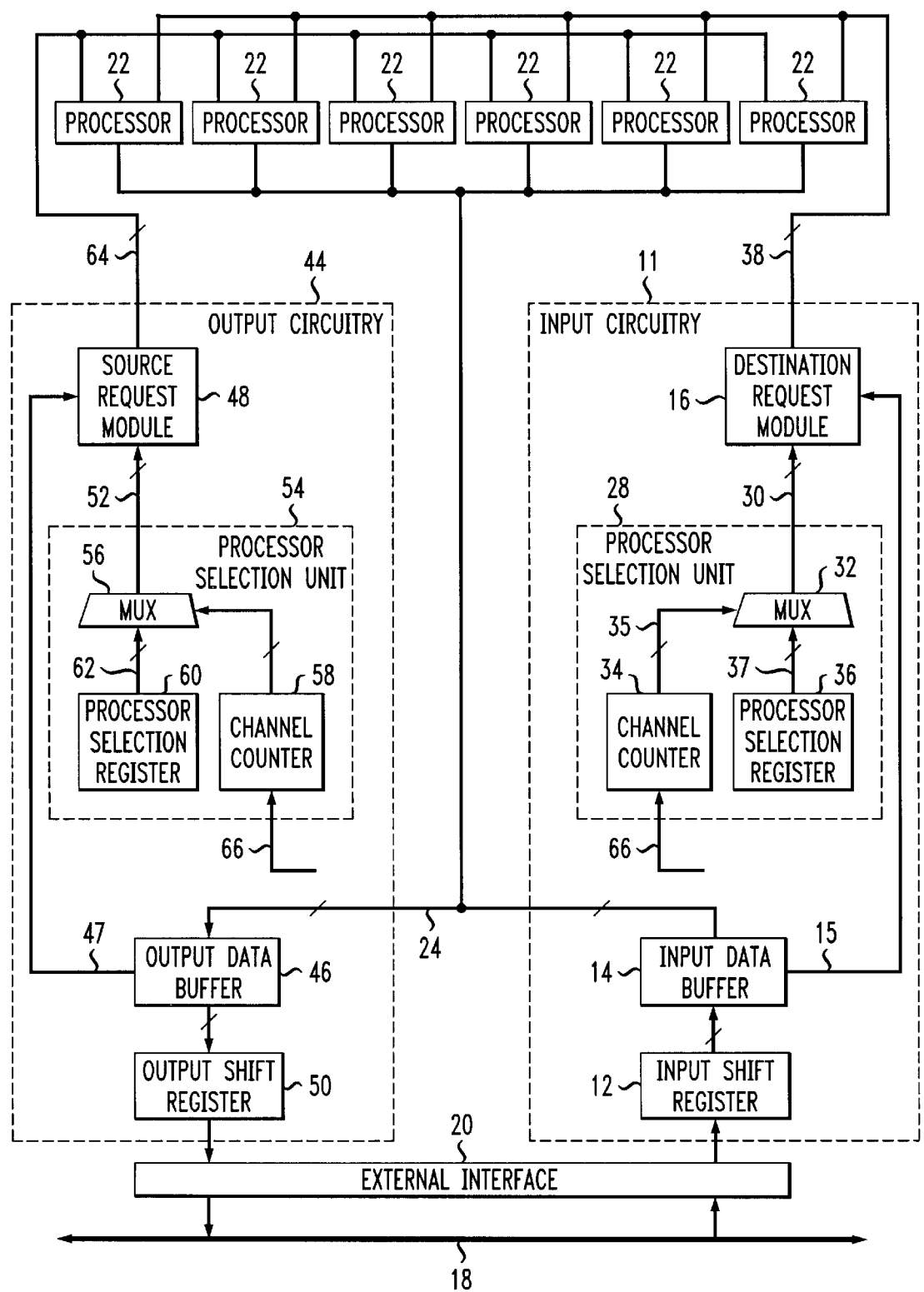
FIG. 1 is a block diagram of a serial interface unit according to an embodiment of the invention having an input data buffer and an output data buffer.

Referring now to FIG. 1 there is shown a block diagram of a serial interface unit 10 in accordance with a preferred embodiment of the present invention. The serial interface unit has input circuitry 11 and output circuitry 44. In a preferred embodiment, the input circuitry 11 and the output circuitry 44 may operate substantially simultaneously.

The input circuitry 11 comprises an input shift register 12, an input data buffer 14 and a destination request module 16. The input data buffer 14, although shown in the embodiment depicted in FIG. 1, is optional and is not necessary to the invention, as demonstrated by the embodiment depicted in FIG. 2. The input shift register 12 is adapted to receive serial input data from a serial data stream 18 via an external interface 20. Preferably, the input shift register 12 is double buffered. The input shift register 12 formats the serial input data into parallel input data. Use of an input shift register 12 to reformat serial data into parallel data is known in the art. It is customary, as shown in FIG. 1, to illustrate a transfer of parallel data between elements in a block diagram by using a hash mark in the line connecting the blocks. The parallel data may be, for example, a word of data, a channel of data, a predetermined number of bits of data, a time-slot of data, or a frame of data. The input data buffer 14 is connected to the shift register 12. Preferably, the input data buffer 14 is double buffered. The input data buffer 14 is also in communication with a plurality of processors 22, via a data bus 24, and the destination request module 16. The plurality of processors 22 may comprise one or more of a digital signal processor, a microprocessor, a microcontroller, or an interface to another circuit for processing data.

In a preferred embodiment, the input data buffer 14 sends an input buffer status signal 15 to the destination request module 16 upon receipt of the parallel input data from the input shift register 12. In the embodiment depicted in FIG. 2, the input shift register 12 sends an input shift register status signal 13 to the request module 16. The input buffer status signal 15 and the input shift register status signal 13 may comprise, for example, logic to determine that the last bit of the serial data stream 18 has been shifted into the input shift register 12.

Preferably, as shown in FIG. 1, a processor selection unit 28 is in communication with the destination request module 16. The processor selection unit 28 provides a processor designation signal 30 to the destination request module 16. The request module 16 communicates with one of the processors 22 in response to the input buffer status signal 15 and the processor designation signal 30.

In a preferred embodiment, the processor selection unit 28 includes a multiplexor 32, a channel counter 34, and a processor selection register 36. The multiplexor 32 is in communication with the destination request module 16, the channel counter 34, and the processor selection register 36. The processor selection register 36 contains a plurality of processor identification information, each of the plurality representing one of the plurality of processors 22. Each processor identification information in the processor selection register 36 corresponds to one of a plurality of channel counts 35 in the channel counter 34. Although this embodiment is described with reference to the processor selection unit of the input circuitry 11, it should be understood that this embodiment also substantially describes an embodiment of the processor selection unit 54 of the output circuitry 44.

Regarding the input circuitry 11, the plurality of processor identification information is a plurality of destination information 37 which is provided to the multiplexor 32. The channel counter 34 provides one of a plurality of channel counts 35 to the multiplexor 32. The count 35 is preferably responsive to a frame sync input signal 66 received at the channel counter 34. The frame sync input signal 66 provides a reference to the channel counter 34 to indicate the start of the serial data stream 18. The channel counter 34 rotates through the channels in response to the frame sync input signal 66 and provides the current channel count to the multiplexor 32. The length of the frame sync input signal 66 is equal to the length of the serial data stream 18. The length can be calculated by multiplying the number of channels in the serial data stream 18 by the number of bits in each channel.

The multiplexor 32 selects one of the plurality of destination information 37 corresponding to the selected count 35, and provides the processor designation signal 30 to the destination request module 16. In this preferred embodiment, the processor designation signal 30 comprises the destination information corresponding to the selected count 35.

The destination request module 16 is in communication with each of the plurality of processors. In one embodiment, the destination request module 16 sends a service request 38 to one of the plurality of processors 22 in response to the processor designation signal 30 and the input buffer status signal 15. The input buffer status signal 15 may comprise an input buffer fill signal. Preferably, the service request 38 is an interrupt request or a status bit.

Figure 3:
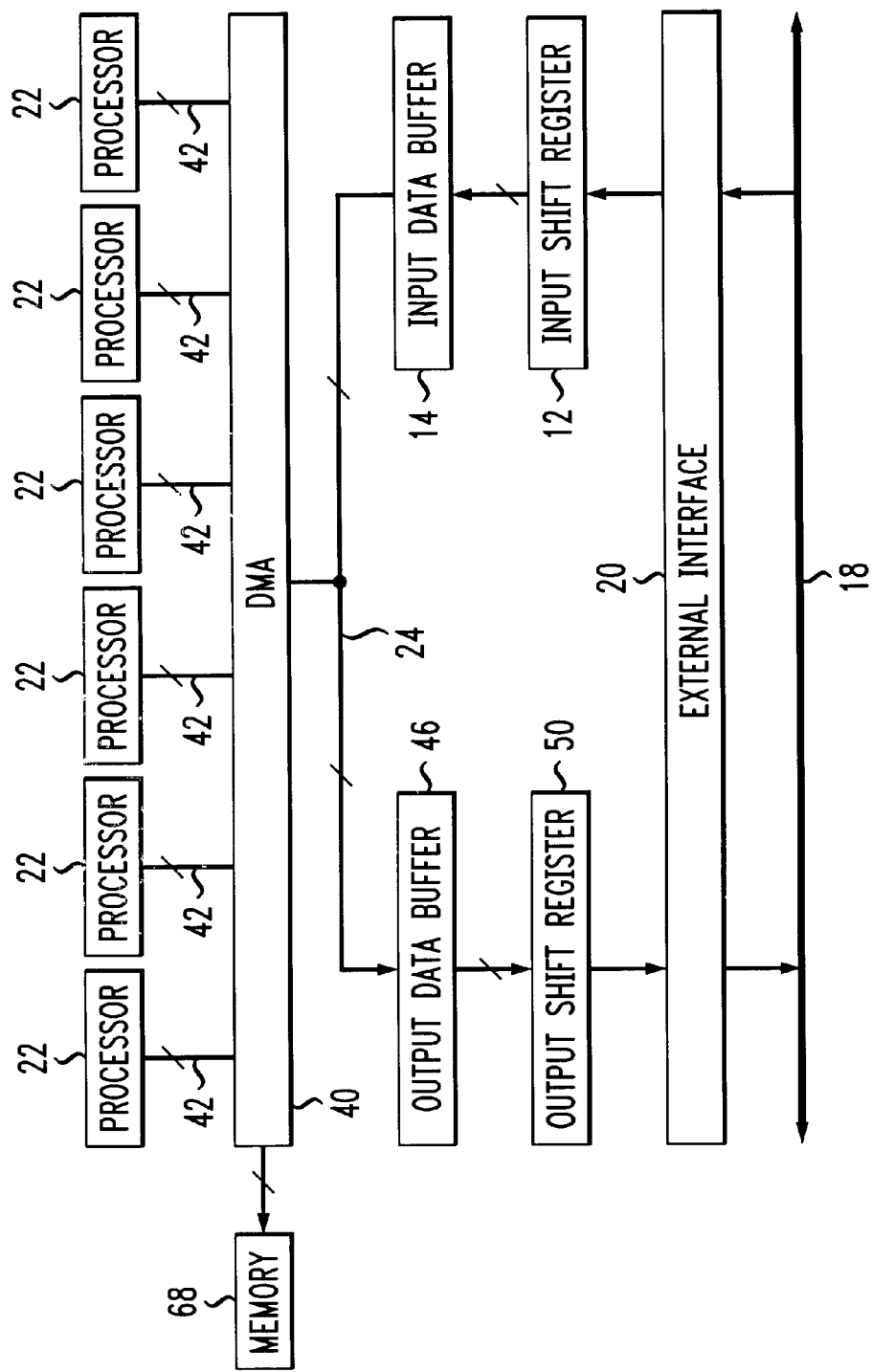
FIG. 3 is a partial block diagram of another embodiment of the invention showing a direct memory access unit on a data bus.

In the embodiment depicted in FIG. 1, the parallel input data residing in the input data buffer 14 is applied to the data bus 24 when the destination request module 16 issues the service request 38 to the selected processor, and upon receipt of a read signal from the selected processor. In a preferred embodiment, the selected processor will read the parallel input data in the input data buffer 14 across the data bus 24. In another embodiment, as shown in FIG. 3, a direct memory access unit (DMA) 40 is included in the serial interface unit 10 between the input data buffer 14 and each of the plurality of processors 22. Preferably, each processor 22 is connected to the DMA 40 through an individual control line 42. The parallel input data is automatically made available to a memory 68 which is also connected to DMA 40. The DMA 40 transmits a status signal over the individual control line 42 to the selected processor when the transfer of parallel input data to the memory 68 is complete. Preferably, the memory 68 is in communication with the selected processor.

Figure 2:
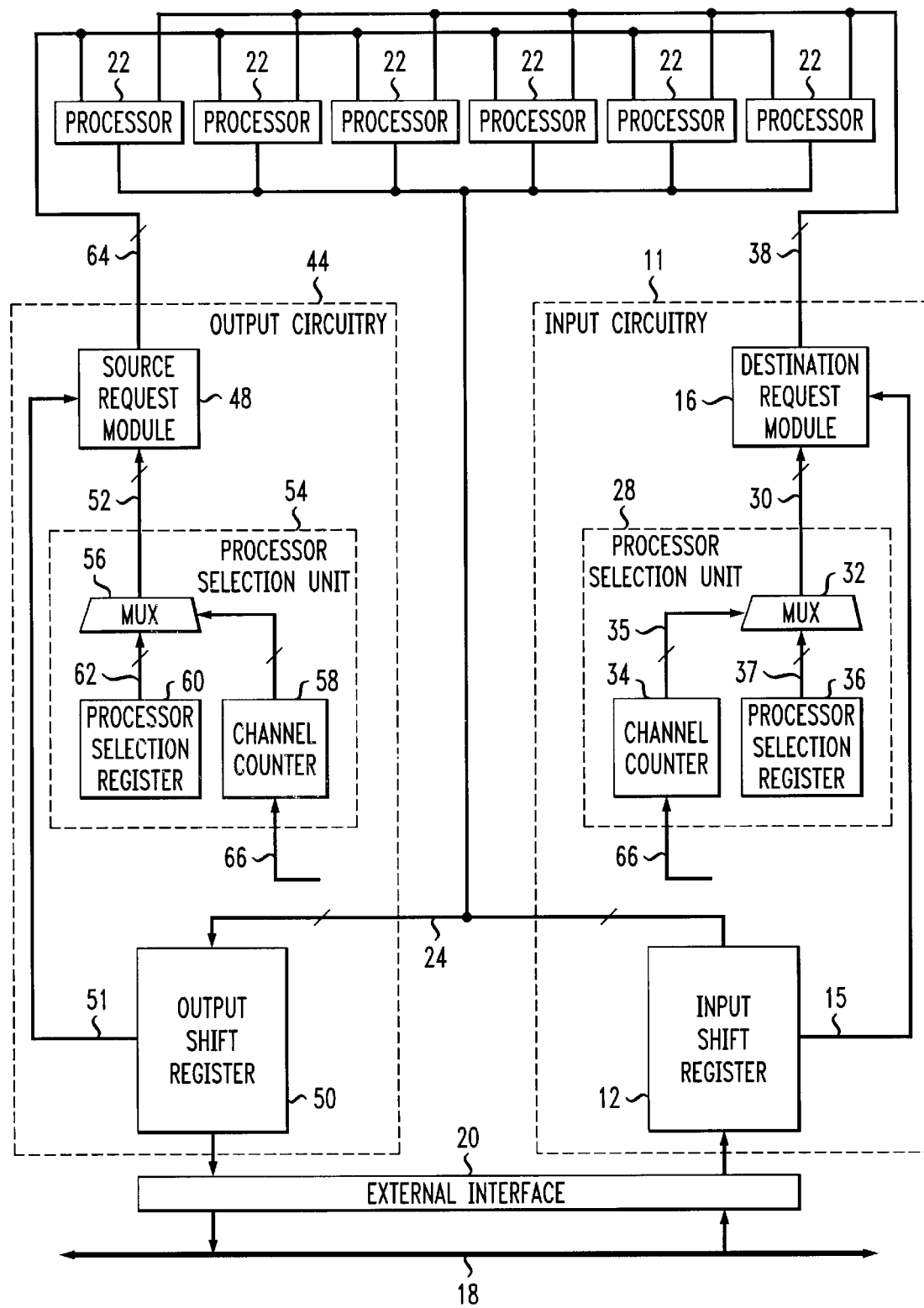
FIG. 2 is a block diagram of a serial interface unit according to an embodiment of the invention without the input data buffer and an output data buffer.

The output circuitry 44 includes an output data buffer 46, a source request module 48, and an output shift register 50. The output data buffer 46, although shown in the embodiment depicted in FIG. 1, is optional and is not necessary to the invention, as depicted in FIG. 2. FIG. 1 shows the output data buffer 46 in communication with the plurality of processors 22 via the data bus 24. The output data buffer 46 is adapted to receive parallel output data from the processors 22. As noted above, the parallel data may be, for example, a word of data, a channel of data, a predetermined number of bits of data, a time-slot of data, or a frame of data. The output shift register 50 is in communication with the output data buffer 46 and is adapted to receive parallel output data from the output data buffer 46. Preferably, the output data buffer 46 and/or the output shift register 50 are double buffered. The output shift register 50 reformats the parallel output data into serial output data. In a preferred embodiment, the serial output data is applied to one of a plurality of channels on the serial data stream 18 via the external interface 20.

In the embodiment of FIG. 1, the source request module 48 is in communication with the output data buffer 46 and communicates with one of the plurality of processors 22 in response to an output buffer status signal 47 and a processor designation signal 52. The output buffer status signal 47 may be, for example, an output buffer empty signal. The output data buffer 46 sends the output buffer status signal 47 to the source request module 48 indicating that the output data buffer 46 is able to accept parallel data from one of the plurality of processors 22.

In the embodiment depicted in FIG. 2, the source request module 48 is in communication with the output shift register 50 and communicates with one of the plurality of processors 22 in response to an output shift register status signal 51 and a processor designation signal 52.

Both the output buffer status signal 47 and the output shift register status signal 51 may comprise, for example, logic to determine that a last bit of serial output data has been shifted out of the output shift register 50.

In the embodiment depicted in FIG. 1, a processor selection unit 54 supplies the processor designation signal 52 to the source request module 48. In another preferred embodiment, and also depicted in FIG. 1, the processor selection unit 54 comprises a multiplexor 56, a channel counter 58, and a processor selection register 60. The processor selection register 60 provides the multiplexor 56 with a plurality of source information 62. The structural relationship and function of the processor selection unit 54 is substantially similar to the structure and function of the processor selection unit 28 of the input circuitry 11 described in greater detail above. Moreover, although FIG. 1 shows a processor selection unit 28 in the input circuitry 11 and a processor selection unit 54 in the output circuitry 44 of the serial interface unit 10, it should be understood that the invention contemplates a single channel selection unit capable of interfacing with both the input circuitry 11 and the output circuitry 44.

In operation, the source request module 48 sends a service request 64 to one of the plurality of processors 22 in response to the processor designation signal 52 and the output buffer status signal 47. Preferably, the service request 64 is an interrupt request or a status bit. The parallel output data residing at one of the plurality of processors 22 is applied to the data bus 24 after the source request module 48 issues the service request 64 to the selected processor, and upon receipt of a write signal from the selected processor. In a preferred embodiment, the output data buffer 46 will read the parallel output data from the selected processor across the data bus 24. In the embodiment shown in FIG. 3, the DMA 40 is connected to the output data buffer 46. Each processor 22 in this embodiment is connected to the DMA 40 through an individual control line 42 and the parallel output data from the memory 68 is automatically made available at the output data buffer 46.

It should be understood that in the embodiment of the invention wherein the input circuitry 11 and the output circuitry 44 operate substantially simultaneously, the selected processor may be a single processor or more than one processor. Although a serial interface unit of the invention contemplates substantially simultaneous processing of input data and output data, it should be understood that the invention contemplates non-simultaneous processing of the data as well. Thus, although an embodiment of the invention contemplates simultaneous processing, the initiation of the input circuitry 11 and the output circuitry 44 may be user definable. For example, the input circuitry 11 and output circuitry 44 may operate independent from one another. In one embodiment, for example, a first clock running at a first rate can control the operation of the output circuit 44 while a second clock operating at a second rate can control the input circuit 11.

What is claimed is:

1. A serial interface unit comprising:

an input shift register adapted to receive a serial input data from a serial data stream, the input shift register converting the serial input data into a parallel input data, the input shift register in communication with at least two processors; and a destination request module in communication with the input shift register, the request module in communication with one of the at least two processors in response to an input shift register status signal and a processor designation signal, the selected processor adapted to receive the parallel input data from the input shift register.

2. A digital signal processor comprising the serial interface unit of claim 1.

3. An integrated circuit comprising the serial interface unit of claim 1.

4. A microcontroller comprising the serial interface unit of claim 1.

5. A microprocessor comprising the serial interface unit of claim 1.

6. The serial interface unit of claim 1 further comprising:
a processor selection unit in communication with the destination request module, the processor selection unit providing the processor designation signal to the destination request module.

7. The serial interface unit of claim 6 wherein the processor selection unit further comprises:
a multiplexor for supplying the processor designation signal to the request module;
a channel counter in communication with the multiplexor, the channel counter providing a predetermined one of a plurality of channel counts to the multiplexor; and
a processor selection register in communication with the multiplexor, the processor selection register providing the multiplexor with a destination information for each of the plurality of channel counts,
wherein the processor designation signal comprises the destination information corresponding to the predetermined channel count.

8. The serial interface unit of claim 7 further comprising a direct memory access unit connected between the input shift register and each of the at least two processors.

9. The serial interface unit of claim 1 wherein at least one of the processors is a digital signal processor.

10. The serial interface unit of claim 1 wherein at least one of the processors is a microprocessor.

11. The serial interface unit of claim 1 wherein at least one of the processors is a microcontroller.

12. A serial interface unit comprising:
an output shift register in communication with at least two processors, the output shift register adapted to receive a parallel output data from at least one of the at least two processors; and
a source request module in communication with the output shift register, the request module in communication with one of the at least two processors in response to an output shift register status signal and a processor designation signal.

13. The serial interface unit of claim 12 further comprising:
a processor selection unit in communication with the source request module, the processor selection unit providing the processor designation signal to the source request module.

14. The serial interface unit of claim 13 wherein the processor selection unit further comprises:
a multiplexor for supplying the processor designation signal to the source request module;
a channel counter in communication with the multiplexor, the channel counter providing a predetermined one of a plurality of channel counts to the multiplexor; and
a processor selection register in communication with the multiplexor, the processor selection register providing the multiplexor with a source information for each of the plurality of channel counts,
wherein the processor designation signal comprises the source information corresponding to the predetermined channel count.

15. The serial interface unit of claim 14 wherein the output shift register is in communication with a serial data stream, said unit further comprising a direct memory access unit operatively connected between the serial data stream and each of the at least two processors.

16. The serial interface unit of claim 12 wherein at least one of the processors is a digital signal processor.

17. The serial interface unit of claim 12 wherein at least one of the processors is a microprocessor.

18. The serial interface unit of claim 12 wherein at least one of the processors is a microcontroller.

19. A serial interface unit comprising:
an input shift register adapted to receive a serial input data from a serial data stream, the input shift register converting the serial input data into a parallel input data;
an input data buffer adapted to receive the parallel input data from the input shift register, the input data buffer in communication with at least two processors;
a destination request module in communication with the input data buffer, the destination request module in communication with one of the at least two processors in response to an input buffer status signal and an input processor designation signal, the selected processor adapted to receive the parallel input data;
an output data buffer in communication with the at least two processors, the output data buffer adapted to receive a parallel output data from at least one of the at least two processors;
a source request module in communication with the output data buffer, the source request module in communication with one of the at least two processors in response to an output data buffer status signal and an output processor designation signal; and
an output shift register adapted to receive the parallel output data from the output data buffer, the output shift register converting the parallel output data into a serial output data.

20. The serial interface unit of claim 19 further comprising:
a processor selection unit in communication with the destination request module and source request module, the processor selection unit providing the input processor designation signal to the destination request module and the output processor designation signal to the source request module.

21. The serial interface unit of claim 20 wherein the processor selection unit further comprises:
a multiplexor for supplying the input processor designation signal to the destination request module, and the output processor designation signal to the source request module;
a channel counter in communication with the multiplexor, the channel counter providing a channel count to the multiplexor; and
a processor selection register in communication with the multiplexor, the processor selection register providing the multiplexor with a destination information and a source information for the channel count,
wherein the input processor designation signal comprises the destination information corresponding the channel count, and the output processor designation signal comprises the source information corresponding to the channel count.

22. The serial interface unit of claim 21 further comprising a direct memory access unit operatively connected between the serial data stream and each of the at least two processors.

23. The serial interface unit of claim 19 further comprising an internal data bus connecting the output data buffer and the input data buffer to the at least two processors.

24. The serial interface unit of claim 23 wherein the input shift register and the output shift register are double buffered.

25. The serial interface unit of claim 19 wherein at least one of the processors is a digital signal processor.

26. The serial interface unit of claim 19 wherein at least one of the processors is a microprocessor.

27. The serial interface unit of claim 19 wherein at least one of the processors is a microcontroller.

28. A method for processing serial input data having a last bit, the method comprising the steps of:
  receiving the serial input data from a serial data stream;
  generating an input shift register status signal upon receipt of the last bit of serial input data;
  converting the serial input data into parallel input data;
  receiving the input shift register status signal at a destination request module;
  generating a processor designation signal representing a designated processor;
  receiving the processor designation signal at the destination request module;
  sending a service request to the designated processor; and
  receiving the parallel input data at the designated processor.

29. The method of claim 28 further comprising the step of requesting the parallel input data from the processor before the step of receiving the parallel input data at the designated processor.

30. The method of claim 28 wherein the parallel input data, in the step of receiving the parallel input data at the designated processor, is received from a direct memory access unit.

31. The method of claim 28 wherein the step of generating a processor designation signal representing a designated processor comprises the steps of:
  storing a plurality of channel counts;
  selecting one of the plurality of channel counts;
  receiving the selected channel count at a multiplexor;
  generating a destination information for each of the plurality of channel counts;
  receiving the destination information for each of the plurality of channel counts at the multiplexor; and
  selecting the destination information corresponding to the selected channel count, the processor designation signal comprising the selected destination information.

32. The method of claim 31 wherein the serial data stream has a stream length comprising a plurality of serial channels, at least one of the serial channels comprising the serial input data, the stream length having a beginning and an end; and wherein the step of selecting one of the plurality of channel counts comprises the steps of
  generating a frame sync signal representing the beginning of the stream length;
  receiving the frame sync signal at a channel counter;
  synchronizing the channel counter with the serial data stream according to the frame sync signal; and
  selecting the channel count according to the frame sync signal.

33. A method for processing parallel output data, the method comprising the steps of:
  viewing a status of an output shift register;
  generating an output shift register status signal when the output shift register is without parallel output data;
  receiving the output shift register status signal at a source request module;
  generating a processor designation signal representing a designated processor;
  receiving the processor designation signal at the source request module;
  sending a service request to the designated processor;
  receiving the parallel output data at the output shift register; and
  converting the parallel output data into serial output data.

34. The method of claim 33 further comprising the step of requesting the parallel output data from the processor before the step of receiving the parallel output data at the output shift register.

35. The method of claim 33 wherein, in the step of receiving the parallel output data at the output shift register, the parallel output data is received from a direct memory access unit.

36. The method of claim 33 wherein the step of generating a processor designation signal representing a designated processor comprises the steps of:
  storing a plurality of channel counts;
  selecting one of the plurality of channel counts;
  receiving the selected channel count at a multiplexor;
  generating a source information for each of the plurality of channel counts;
  receiving the source information for each of the plurality of channel counts at the multiplexor; and
  selecting one of the plurality of source information corresponding to the selected channel count, the processor designation signal comprising the selected source information.

37. The method of claim 36 further comprising the step of receiving the serial output data on one of a plurality of serial channels on a data stream after the step of converting the parallel output data into serial output data; and wherein the step of selecting one of the plurality of channel counts comprises the steps of
  generating a frame sync signal representing a beginning of the data stream;
  receiving the frame sync signal at a channel counter;
  synchronizing the channel counter with the serial data stream according to the frame sync input signal; and
  selecting the channel count according to the frame sync input signal.

38. A method for substantially simultaneously processing serial input data from a serial data stream and parallel output data from at least two processors via a serial interface unit, the method comprising the steps of:
  processing the serial input data comprising the steps of
    receiving the serial input data from a serial data stream;
    generating an input shift register status signal upon receipt of the last bit of serial input data;
    converting the serial input data into parallel input data;

receiving the input shift register status signal at a destination request module;

generating processor designation signal representing a designated processor;

receiving the processor designation signal at the destination request module;

sending a first service request to the designated processor;

receiving the parallel input data at the designated processor; and substantially simultaneously processing the parallel output data comprising the steps of viewing a status of an output shift register;

generating an output shift register status signal when the output shift register is without parallel output data;

receiving the output shift register status signal at a source request module;

receiving the processor designation signal at the source request module;

sending a second service request to the designated processor;

receiving the parallel output data at the output shift register; and converting the parallel output data into serial output data.

39. The method of claim 38 wherein the designated processor is a single processor.

40. The method of claim 38 wherein the designated processor comprises a first processor and a second processor and the processor designation signal comprises a first processor designation signal and a second processor designation signal.

41. The method of claim 38 wherein the step of generating a processor designation signal representing a designated processor comprises the steps of:

storing a plurality of channel counts;

selecting one of the plurality of channel counts;

receiving the selected channel count at a multiplexor;

generating a processor identification information for each of the plurality of channel counts;

receiving the processor identification information for each of the plurality of channel counts at the multiplexor; and selecting at least one of the plurality of processor identification information corresponding to the selected channel count, the processor designation signal comprising the selected processor identification information.

42. The method of claim 41 further comprising the step of receiving the serial output data on one of a plurality of serial channels on a data stream after the step of converting the parallel output data into serial output data; and wherein the step of selecting one of the plurality of channel counts comprises the steps of generating a frame sync signal representing a beginning of the data stream;

receiving the frame sync signal at a channel counter;

synchronizing the channel counter with the serial data stream according to the frame sync input signal; and selecting the channel count according to the frame sync input signal.

* * * * *